United States Patent [19]

Zirps

[11] Patent Number: 4,888,952
[45] Date of Patent: Dec. 26, 1989

[54] RE-ASPIRATION VALVE FOR MASTER BRAKE CYLINDERS

[75] Inventor: Wilhelm Zirps, Hemmingen, Fed. Rep. of Germany

[73] Assignee: Robert Bosch GmbH, Stuttgart, Fed. Rep. of Germany

[21] Appl. No.: 192,095

[22] Filed: May 10, 1988

[30] Foreign Application Priority Data

May 21, 1987 [DE] Fed. Rep. of Germany ....... 3717090

[51] Int. Cl.⁴ .......................... B60T 11/28; F15B 7/08
[52] U.S. Cl. ......................................... 60/589; 60/562; 60/592; 251/127; 251/339
[58] Field of Search ................... 251/127, 339; 29/156.7 A; 60/584, 585, 589, 594, 592, 562

[56] References Cited

U.S. PATENT DOCUMENTS

| | | | |
|---|---|---|---|
| 2,908,290 | 10/1959 | Hamilton-Peters et al. | 251/118 X |
| 3,168,111 | 2/1965 | Strauss | 137/625.3 |
| 3,321,173 | 5/1967 | Seger | 251/61.5 X |
| 3,885,391 | 5/1975 | Campbell et al. | 60/581 |
| 4,267,697 | 5/1981 | Hodkinson | 60/589 |
| 4,422,875 | 12/1983 | Nakata et al. | 29/156.7 A |
| 4,492,082 | 1/1985 | Belart | |
| 4,531,273 | 7/1985 | Smith et al. | 29/156.7 A |
| 4,621,498 | 11/1986 | Schaefer | 60/589 X |
| 4,709,551 | 12/1987 | Saalbach et al. | 60/589 |

FOREIGN PATENT DOCUMENTS

| | | | |
|---|---|---|---|
| 57855 | 8/1982 | European Pat. Off. | 60/589 |
| 3116584 | 11/1982 | Fed. Rep. of Germany | 60/589 |
| 3424513 | 1/1986 | Fed. Rep. of Germany | 60/589 |
| 2067252 | 7/1981 | United Kingdom | 60/589 |

Primary Examiner—Edward K. Look
Attorney, Agent, or Firm—Edwin E. Greigg

[57] ABSTRACT

A master brake cylinder including a re-aspiration valve which is disposed as a central valve in pistons of the master brake cylinder. The re-aspiration valve has a porous body, comprising porous metal, which forms a flat valve seat at one end. The sealing body of the re-aspiration valve is raised gently from the valve seat even at high ambient pressure, which makes a re-aspiration valve embodied in this way particularly suitable for use in master brake cylinders of brake systems having slip control. Because the porous body comprises porous metal which differs in length from its wall surface at one end to its axis to form a conical void space. The porous body has an axial flow resistance that decreases from the outside wall inward to its axis.

20 Claims, 3 Drawing Sheets

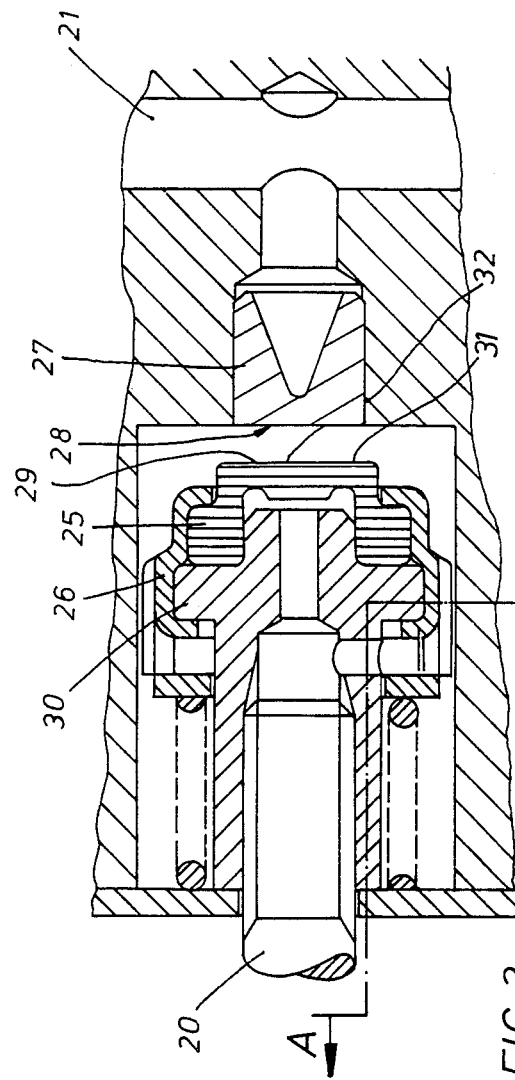
FIG. 2
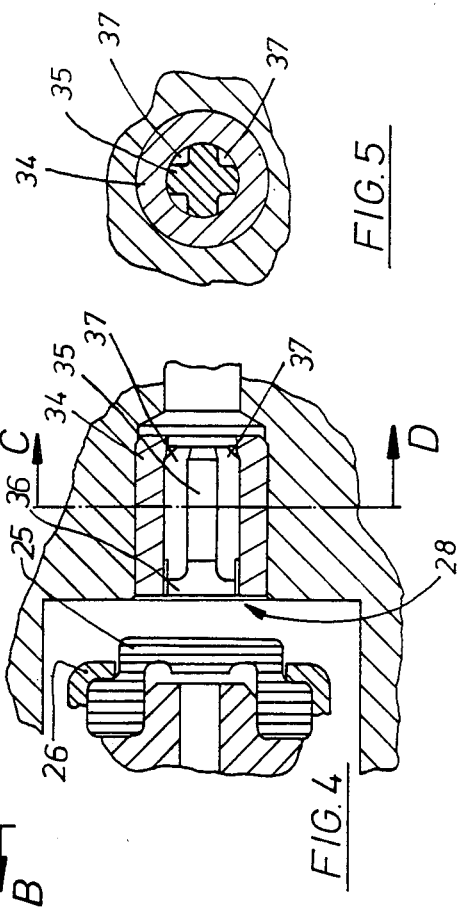
FIG. 5
FIG. 4
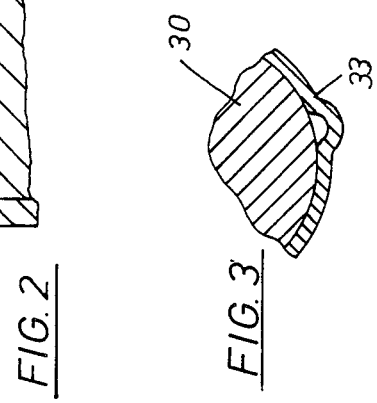
FIG. 3

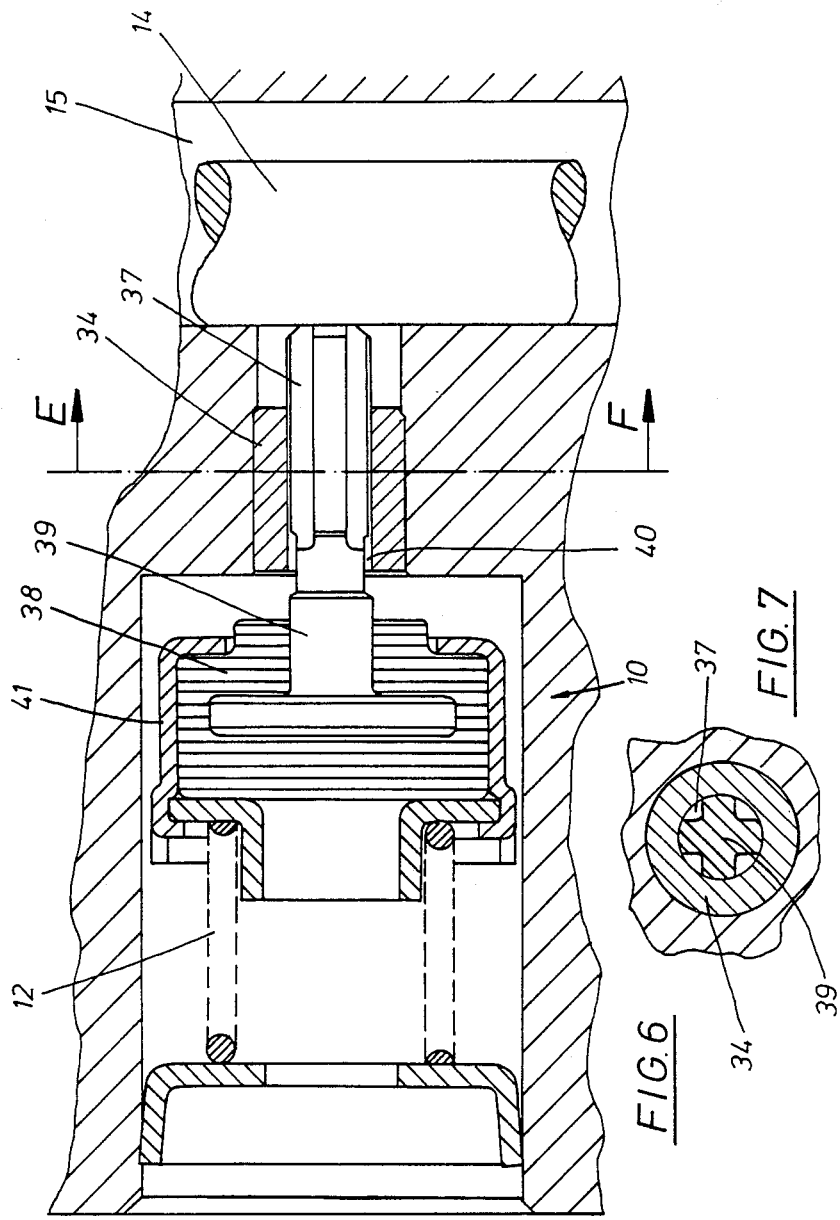

4,888,952

RE-ASPIRATION VALVE FOR MASTER BRAKE CYLINDERS

BACKGROUND OF THE INVENTION

The invention relates to a re-aspiration valve for master brake cylinders.

For filling brake systems for example belonging to a motor vehicle, re-aspiration valves are used in the master brake cylinder. In the aspiration position of the brake pedal, in the pressure-free state, they enable an exchange of fluid between the supply container and the brake system and thus assure a uniform fill level of the brake system. In brake systems having brake slip control, the fill level varies during the control process, so that considerable pressure differences become operative when the re-aspiration valves are opened. If the re-aspiration valve is also involved in the control process, then the fluid flow must be meterable. Re-aspiration valves for this usage must be tight; it must be possible to open them without damage under high pressure, and the fluid throughput must be able to increase steadily with an increasing valve stroke.

OBJECT AND SUMMARY OF THE INVENTION

The re-aspiration valve has an advantage that by the use of a valve seat holder of porous material, a particularly gentle opening is possible, even at high pressure. The valve seat holder forms a flat valve seat for the sealing face of the elastic sealing body, which when the valve opens moves first outwardly away from the valve seat and then inwardly as well, as the valve opens to an increasing extent. This gradual loosening of the sealing body from the valve seat is also known as "peeling". It is particularly advantageous to make the valve seat holder from a porous metal, which lends the valve seat holder a flow resistance that increases from the outer circumference inward. However, the valve seat holder can also be embodied as a cylindrical hollow body, which has a wall thickness that decreases toward its center axis; it may also have a circular-annular valve opening in its inner valve seat region. With these provisions, a desired opening behavior for the re-aspiration valve can be attained; a circular-annular valve opening has minimal flow resistance when the re-aspiration valve is fully opened. The valve opening may be embodied as an annular gap between the valve seat holder, embodied as a bushing, and a pin inserted into the bushing.

The valve shaft can be guided through the valve seat holder, and can be actuated by means of an actuating pin. The sealing body, mounted on the end of the valve shaft, is encompassed on its circumference by a sleeve, which lends the sealing body an elasticity, in the vicinity of its sealing face, that increases toward the center axis. This provision reinforces the desired opening behavior, in which first the outer regions and only after that the inner regions of the sealing face are lifted from the valve seat.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 shows a re-aspiration valve on a larger scale;

FIG. 3 is a section taken along the line A-B of the re-aspiration valve shown in FIG. 2;

FIG. 4 shows a further embodiment of a re-aspiration valve;

FIG. 5 is a section taken along the line C-D of the re-aspiration valve shown in FIG. 4;

FIG. 6 shows a further embodiment of a re-aspiration valve; and

FIG. 7 is a section taken along the line E-F of the re-aspiration valve shown in FIG. 6.

DESCRIPTION OF THE PREFERRED EMBODIMENTS

Figure 1:
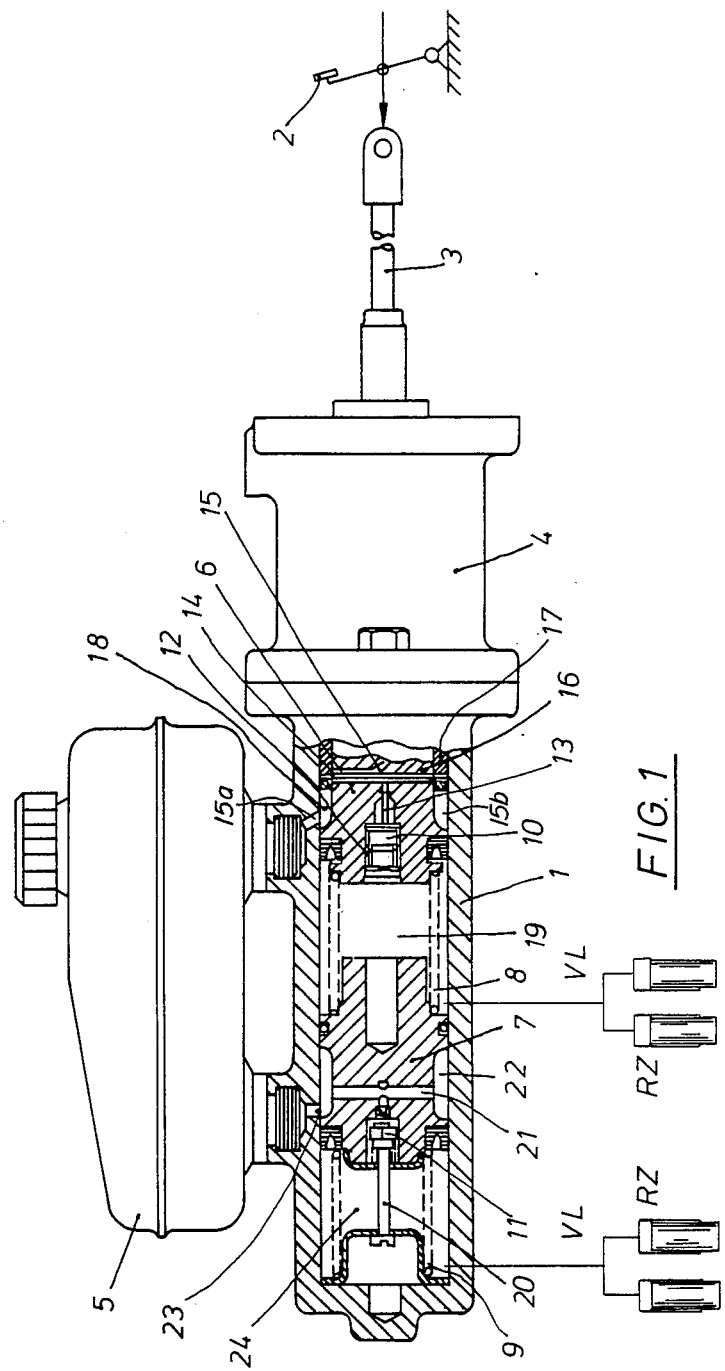
FIG. 1 shows a master brake cylinder having two re-aspiration valves.

The master brake cylinder 1 shown in FIG. 1 is actuatable via a foot pedal 2, a pressure rod 3 and a brake booster 4. A container 5 that serves as a supply container for the brake fluid is mounted on the master brake cylinder 1. Located in the master brake cylinder 1 are two pistons 6, 7, of which the piston 6 is actuated via the brake booster 4 and the piston 7 is a floating piston, which is fastened in between two springs 8, 9. Two re-aspiration valves 10, 11 are provided, one located in each of the two pistons 6, 7, and are actuated as a function of the position of the pistons 6, 7.

The re-aspiration valve 10 is supported on a spring 12 and via the valve shaft 13 on an actuation pin 14, which penetrates the piston 6 in a bore 15 and is secured on a ring 16. The actuating pin 14 is smaller in diameter than the bore 15 and hence can be axially displaced, along with the ring 16, relative to the piston 6. If the ring 16 comes to a stop on a shoulder 17 firmly connected to the housing of the master brake cylinder 1, and if the piston 6 continues to move farther to the left into the outset position shown, then the valve 10 is lifted from the valve seat, counter to the spring 12, so that the annular chamber 18 is opened toward the work chamber 19, via the transverse bore 15 and via the re-aspiration valve 10. Hence there is a connection between the work chamber 19 and the supply container 5 via a bore 15a in the housing, an annular groove 15b in the piston 6, transverse bore 15 and the open valve 10.

The re-aspiration valve 11 in the piston 7 is raised from the valve seat by the spring 9, via the shaft screw 20, shortly prior to the attainment of the outset position shown. The connection between a second work chamber 24 and the supply container 5 is opened via a transverse bore 21, a second annular chamber 22, and a bore 23 in the housing.

Connecting lines VL leading to wheel brake cylinder RZ are also shown in the drawing.

Various exemplary embodiments for the re-aspiration valves 10, 11 are shown in the drawings that follow.

The re-aspiration valve shown in FIG. 2 has a rubber sealing body 25, which is encompassed by a sleeve 26. Cylindrical porous metal body 27 through which fluid flows is provided with a flat valve seat 28 on one face end, on which the sealing face 29 of the sealing body 25 rests when the re-aspiration valve is closed. The end of the cylindrical porous metal body opposite from the flat valve seat 28 is provided with a conical cut-out portion with the apex end of the conical portion toward the flat valve seat. The conical cut-out forms a porous structure in which the axial length of the body 27 becomes less in a progression from its outer wall to the apex of the conical cut-out. Thus, the fluid flow along the axis will be greater because of less material through which the fluid flows. A shaft screw 20 here serves as the valve shaft; a valve body 30 is secured on the valve shaft and in turn supports the sealing body 25.

By means of the sleeve 26, which encompasses the circumference of the sealing body 25, an elasticity that increases toward the middle of the sealing body 25 is obtained, which upon opening of the re-aspiration valve assures gentle lifting from the valve seat 28, even at high ambient pressure. When the re-aspiration valve opens, the outer region 31 opens first, and the inner region 32 does not lift from the valve seat 28 until after that. This gentle opening is reinforced by the embodiment of the cylindrical porous metal body 27, which has a greater fluid flow resistance in the outer region than in the inner region because of the difference between the amount of porous material in its outer region and that at its axis resulting from the conical cut-out set forth above.

In FIG. 3, which is a section taken along the line A-B of FIG. 2, it is apparent that the sleeve 26 has longitudinally extending recesses 33, which serve as guide elements.

The re-aspiration valve shown in FIG. 4 is illustrated by a cylindrical a porous metal body 34, which includes a valve seat 28 on one face and is embodied as a bushing into which a pin 35 is fitted. In the vicinity of the valve seat, the pin 35 forms an annular gap 36 that communicates with recesses 37.

In FIG. 5, a section taken along the line C-D through the cylindrical porous metal body 34 of FIG. 4 is shown. This view more clearly shows the recesses 37 along which fluid flows.

FIG. 6 shows a further embodiment of a re-aspiration valve, which for receiving the sealing body 38 has a valve shaft 39, which is actuatable by the actuating pin 14 (FIG. 1). The actuating pin 14 is supported in a transverse bore 15 that has a diameter larger than the actuating pin 14.

The valve shaft 39 has a tapered portion 40, which in the position shown forms an annular gap between itself and the porous valve seat holder 34 embodied as a bushing. Recesses 37, of the kind also provided on the pin 35 shown in FIG. 4, are also provided here on the valve shaft 39.

The valve shaft 39 is plate-shaped at its end and engages the sealing body 38, which is encompassed by a sleeve 41. The re-aspiration valve 10 shown here is supported between the spring 12 and the actuating pin 14.

FIG. 7, shows a section taken along the line E-F through the cylindrical porous metal body 34 and the valve shaft 13 of FIG. 6.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A master brake cylinder including a re-aspiration valve including a brake fluid container, said re-aspiration valve is embodied as a central valve in a piston and includes a valve shaft, an elastic sealing body mounted on said valve shaft and being operative within a work chamber and permits fluid flow to said fluid container, said re-aspiration valve (10, 11) includes a valve seat at least partly embodied by a porous body (27, 34) that is permeable to the brake fluid, and is in permanent hydraulic communication with said brake fluid container.

2. A master brake cylinder including a re-aspiration valve as defined by claim 1, in which said porous body (27, 34) has a flow resistance along its length that decreases axially from its outer circumference inward toward its axis.

3. A master brake cylinder including a re-aspiration valve as defined by claim 2, in which said porous body (27, 34) is embodied as a hollow cylindrical body, which is fitted into a bore provided in a piston (6, 7).

4. A master brake cylinder including a re-aspiration valve as defined by claim 3, in which said porous body (27) has a porous wall thickness in which the length of the porous body material decreases in the flow direction from its outer wall to its center axis.

5. A master brake cylinder including re-aspiration valve as defined by claim 3, in which said hollow cylindrical porous body (34) comprises porous, permeable material along its length only in an outer valve seat region and has a circular-annular opening along its axis.

6. A master brake cylinder including a re-aspiration valve as defined by claim 2, in which said porous body (27) has a porous wall thickness in which the length of the porous body material decreases in the flow direction from its outer wall to its center axis.

7. A master brake cylinder including a re-aspiration valve as defined by claim 2, in which said porous body (34) comprises porous, permeable material along its length only in an outer valve seat region and has a circular-annular opening along its axis.

8. A master brake cylinder including a re-aspiration valve as defined by claim 2, in which said porous body (34) is embodied as a bushing, into which a pin (35) is fitted, which in the vicinity of said valve seat (28) uncovers an annular gap (36), as a flow opening, between said porous body (34) and said pin (35).

9. A master brake cylinder including a re-aspiration valve as defined by claim 2, in which said valve shaft (13), for receiving the sealing body (38), has a plate-shaped end, which is completely encompassed by the sealing body (38).

10. A master brake cylinder including a re-aspiration valve as defined by claim 2, in which said sealing body (25, 38) is encompassed on its circumference by a sleeve (26, 41), so that the sealing body (25, 38) has an elasticity that increases toward its center axis.

11. A master brake cylinder including a re-aspiration valve as defined by claim 1, in which said porous body (27, 34) is embodied as a hollow cylindrical body, which is fitted into a bore provided in a piston (6, 7).

12. A master brake cylinder including a re-aspiration valve as defined by claim 11, in which said hollow cylindrical porous body (27) has a porous wall thickness in which the length of the porous body material decreases in the flow direction from its outer wall to its center axis.

13. A master brake cylinder including a re-aspiration valve as defined by claim 11, in which said hollow cylindrical porous body (34) comprises porous, permeable material along its length only in an outer valve seat region and has a circular-annular opening along its axis.

14. A master brake cylinder including a re-aspiration valve as defined by claim 11, in which said hollow cylindrical porous body (34) is embodied as a bushing, into which a pin (35) is fitted, which in the vicinity of said valve seat (28) uncovers an annular gap (36), as a flow opening between said hollow cylindrical porous body (34) and said pin (35).

15. A master brake cylinder including a re-aspiration valve as defined by claim 1, in which said porous body (27) has a porous wall thickness in which the length of the porous body material decreases in the flow direction from its outer wall to its center axis.

16. A master brake cylinder including a re-aspiration valve as defined by claim 1, in which said porous body (34) comprises porous, permeable material along its length only in an outer valve seat region and has a circular-annular opening along its axis.

17. A master brake cylinder including a re-aspiration valve as defined by claim 16, in which said porous body (34) is embodied as a bushing, into which a pin (35) is fitted, which in the vicinity of said valve seat (28) uncovers an annular gap (36), as a flow opening, between said porous body (34) and said pin (35).

18. A master brake cylinder including a re-aspiration valve as defined by claim 1, in which said valve shaft (13), for receiving the sealing body (38), has a plate-shaped end, which is completely encompassed by the sealing body (38).

19. A master brake cylinder including a re-aspiration valve as defined by claim 1, in which said sealing body (25, 38) is encompassed on its circumference by a sleeve (26, 41), so that the sealing body (25, 38) has an elasticity that increases toward its center axis.

20. A master brake cylinder including a re-aspiration valve including a brake fluid container, said re-aspiration valve is embodied as a central valve in a piston and includes a valve shaft, an elastic sealing body mounted on said valve shaft and being operative between a work chamber and said fluid container, said re-aspiration valve (10, 11) includes a hollow cylindrical porous body (34) that is permeable to the brake fluid, and said valve shaft (13) is guided through said hollow cylindrical porous body (34) and is actuatable by an actuating pin (14) that is axially displaceable in a transverse bore (15).

* * * * *